United States Patent [19]
Baratti
[11] 4,362,065
[45] Dec. 7, 1982

[54] REPLACEMENT STARTING MOTOR ASSEMBLY

[75] Inventor: Mario Baratti, Chicago, Ill.
[73] Assignee: Samar, Import and Export, Inc., Rosemont, Ill.

[21] Appl. No.: 309,605
[22] Filed: Oct. 8, 1981
[51] Int. Cl.[3] ...................... F02N 15/06; B22D 19/10; B23P 6/00
[52] U.S. Cl. .................................. 74/7 A; 29/401.1; 29/402.08; 74/6; 123/DIG. 1; 123/195 A; 123/179 M; 290/DIG. 1; 310/1; 310/112; 403/3
[58] Field of Search ........................... 74/6, 7 R, 7 A; 29/401.1, 402.08; 290/DIG. 1; 310/1, 112; 403/3, 4; 123/DIG. 1, DIG. 7, 195 A, 179 M

[56] References Cited

U.S. PATENT DOCUMENTS 2,441,990 5/1948 Calhoun ............................... 74/7 X
3,772,938 11/1973 Johnson ...................... 123/195 A X
3,841,290 10/1974 Schubeck ........................ 123/195 A
4,155,266 5/1979 Bradley .......................... 123/195 A

*Primary Examiner*—Allan D. Herrmann
*Attorney, Agent, or Firm*—Hill, Van Santen, Steadman, Chiara & Simpson

[57] ABSTRACT

A replacement starting motor of the type for use in starting a passenger vehicle internal combustion engine is provided by converting a donor motor originally manufactured for one engine installation into a form making it a substitute for a starting motor manufactured for a different engine installation. The motor shell and solenoid housing and internal features contained therein are retained as a core from the donor starting motor in the replacement starting motor. A newly developed end cap assembly having a shape and spacial dimensions enabling the retained components of the donor starting motor to fit the different engine installation of the starting motor being replaced is attached to the donor core. A newly developed pinion sleeve having a unique length dimension is provided in the replacement starting motor to enable the retained components of the donor starter to properly bring the drive pinion into and out of driving engagement with the flywheel associated with the different engine installation. The armature shaft of the donor starting motor is length-adjusted to enable the replacement starter to fit the spacial requirements of the different engine installation. After the replacement starting motor is assembled, it is of unique construction distinct from the starter it is to replace and the donor starting motor from which it was adapted.

20 Claims, 6 Drawing Figures

REPLACEMENT STARTING MOTOR ASSEMBLY

BACKGROUND OF THE INVENTION

The invention relates to the manufacture of starting motors for passenger vehicle internal combustion engines and, more particularly, to a method and apparatus for converting an engine starting motor from one engine installation for use in a different engine installation.

Internal combustion engines used in passenger vehicles, such as cars or trucks, are generally started by rotating the flywheel until the engine fires and continues to run on its own power. The flywheel is usually rotated by a starting motor fed with current from the battery. The electric starting motor contains a rotatable driveshaft over which is slidably disposed a pinion gear wheel which, on commencement of the starting operation, is shifted forward until it engages with the toothed rim of the flywheel. The driving motor of the starter then rotates its shaft which rotates the flywheel. When the engine has started up, the pinion is retracted and disengaged from the flywheel.

Although other types of electric starting motors are available, most, if not all, present-day internal combustion vehicles utilize an inertia gear drive or Bendix type starter. The Bendix starter includes a main casing shell for containing an electric motor, including a rotary armature mounted concentrically on a driveshaft. Mounted adjacent the casing shell is a smaller cylindrical housing containing a solenoid switch mechanism including a reciprocable armature. In this type of starter, the pinion is carried on a sleeve which can be shifted back and forth along the driveshaft on a quick screw thread. A hollow housing end cap is positioned across adjacent parallel-facing open ends of the solenoid housing and motor shell. The end cap contains a pivotable trigger lever connected at respective opposed ends with the solenoid armature and the pinion sleeve. During car steering operation, the operator turns a key in the ignition activating a starting circuit which establishes electrical connection between the battery and the solenoid switch. A powerful magnetic field is set up in the solenoid switch which attracts the solenoid armature, pulling the solenoid armature rearward against the bias of a return spring force and with it the corresponding end of the trigger level. The opposed end of the trigger lever is then pivoted forward, pushing forward the pinion sleeve as it rotates about the screw thread formed on the driveshaft. The solenoid switch then closes and current flows to a commutator which causes rotation of the motor armature. As the motor armature begins to rotate, the pinion sleeve is screwed completely forward until the pinion engages with the gear rim on the flywheel. The solenoid switch is held in its closed position by a holding coil and the starting motor can now turn the engine. When the engine fires, the starting circuit is deactivated by the operator, such that the solenoid armature thrust forwardly under the force of the return spring. This brings the trigger lever back to the home position such that the pinion sleeve is also returned and the pinion is out of driving engagement with the flywheel.

Although most, if not all, automobiles utilize a Bendix type starter, individual car manufacturers, such as Ford, Chrysler, and Volkswagen, provide their cars with unique starting motor mountings, including housing configurations, spacial dimensions, and support brackets, and have individual starting motor power factors. This situation usually necessitates replacement of a vehicle starting motor with a duplicate purchased from the auto manufacturer, since the starting motor from a different auto manufacturer does not typically have mounting requirements suitable to replace the starting motor in the car built by another manufacturer. Accordingly, the cost to a purchaser for replacing a starting motor results is substantially higher, allowing for profit, then the production cost to manufacture an original starter. However, a tremendous number of cars which are junked contain starting motors in good working order. Prior to this invention these motors had little value being limited for installation only in cars of the same make and most probably also of the same vintage. Thus, if a generalized manufacturing arrangement could be devised which would adapt the starting motors from junked cars of one manufacture to fit starter mounting requirements for cars of other manufacturers, rebuilt starting motors could be purchased to replace original defective starting motors. Because the rebuilt starters are made from low cost used originals, these replacement starters can be sold at a relatively much reduced price, saving the puchaser on the order of about 50 percent or more to replace a starting motor.

The invention is directed to a method and apparatus for adapting starting motors from one vehicle manufacturer to meet the mounting requirements for starters in vehicles of different manufacturers, thus enabling a cost savings to purchasers of replacement starters and affording a competitive market with auto manufacturers in the field of replacement starting motors.

SUMMARY OF THE INVENTION

As replacement for the original starting motor in the car or truck made by one auto manufacturer, a suitable starting motor to be converted is selected from a junked vehicle which may be built by another auto manufacturer. To be a suitable conversion, the junked vehicle starter should be of the same type, such as Bendix for Bendix, as the original starter, have a driveshaft with a sense of rotation corresponding to that of the original starter, have a power factor about equal to or greater than that required in the original starter, and have spacial dimensions for the solenoid switch housing and starting motor casing shell core to fit within the spacial confines set by the original starting motor mountings. A new end cap assembly is provided for the replacement starting motor having a shape and spacial dimensions suitable for adapting the donor converted starter core to the donor starting motor in the receiving vehicles. The armature or driveshaft of the donor starter is retained, but is lengthened or shortened as necessary to fit the mounting confines of the receiving installation. For this purpose, a new pinion sleeve is provided for the donor starting motor dimensioned to act along the adjusted armature shaft for proper pinion gear engagement with and retraction from the gear rim of the flywheel in the receiving vehicle's engine installation. Thus, the starting motor from one engine installation built by a first vehicle manufacturer can be converted to replace the original starting motor in a different engine installation built by a second vehicle manufacturer. After the conversion process is complete, the replacement starting motor will be of a unique construction distinct from the original starting motor it is to replace and the starting motor from which it was adapted; however the replacement starting motor will be able to substitute for the original starting motor even though its mounting requirements are different from any other vehicle manufacturer's, including the engine installation from which the replacement starting motor core was selected.

DESCRIPTION OF THE PREFERRED EMBODIMENTS

For purposes of this discussion, the term vehicle is used to apply to passenger cars or automobiles, trucks, and buses powered by an internal combustion engine. Vehicles come in various sizes, such as compact and standard models, accommodating from two to nine passengers. There are various individual vehicle or auto manufacturers, such as Ford, Toyota, Chrysler, and Volkswagen, whose names will be used for purposes of this discussion to designate different makes of vehicles; however, the manufacturers produce all sizes and types of vehicles. Different vehicle types and sizes have different types of engine installations, which may be distinguished by the type of transmission, whether automatic or manual, the overall size and length of the engine, number of cylinders, overall configuration, and relative spatial confines for associated engine mountings under the engine hood. In many cases, a single manufacturer will produce cars of one size but different styles, which may have different engine installations or produce cars of one style having different engine installations depending on the type of transmission.

Electric starting motors are used in virtually all vehicles for start-up of the internal combustion engine. Present day vehicle engine starting motors typically differ among the various engine installations available in such areas as arrangement of starter mountings, overall spatial dimensions of the starting motor, power factor, sense of rotation, and housing end cap configuration. Accordingly, replacement of a starting motor in one engine installation by that from another ending installation has not been conveniently possible until now. There are various types of electric starting motors to which the present invention applies; however, for purposes of discussion, the features of the invention will be described with relation to Bendix type starters.

Figure 1:
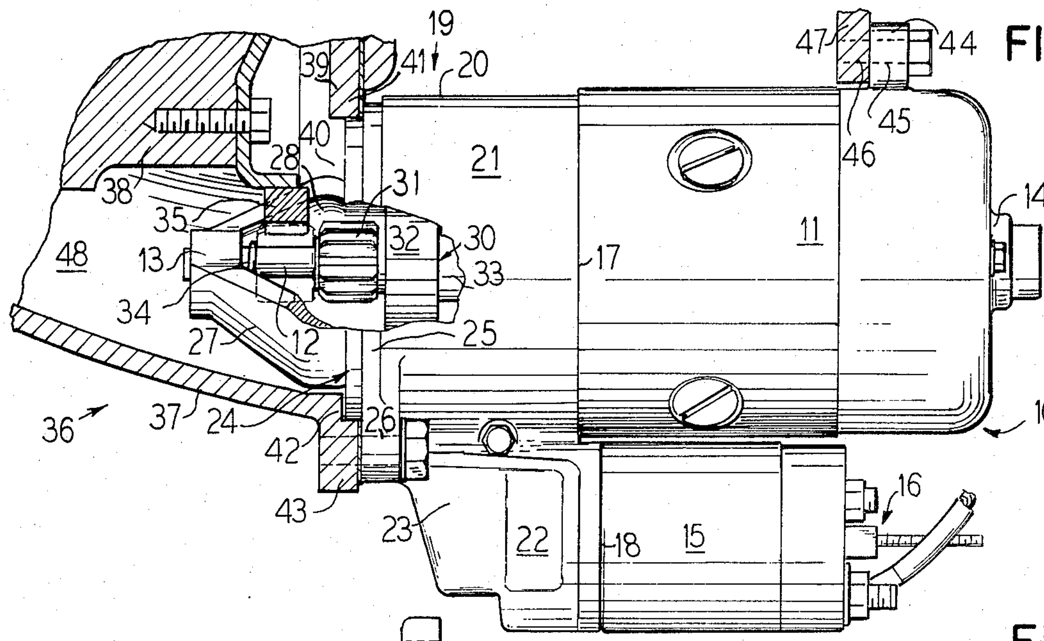
FIG. 1 is a broken-away side elevational view of an electric starting motor of the Bendix type originally manufactured for starter mounting requirements in an engine installation of one vehicle manufacturer.

FIG. 1 shows an original Bendix type starting motor 10 produced by one vehicle manufacturer, namely Chrysler, for use in the particular engine installation Chrysler has established for certain compact style vehicles, namely the Chrysler Omni and Chrysler's Dodge Horizon, having automatic transmissions and four cylinder engines. The starter 10 is formed with a cylindrical main casing shell 11 for housing an electric motor assembly having exciter windings and pole shoes adjacent the inner walls of the shell 11 concentric about an armature mounted annularly on a portion of a relatively longitudinally elongated driveshaft 12. The driveshaft is journalled for rotation in a forward journal mounting 13 and a rearward journal housing 14 formed on the trailing end of the shell 11. Positioned on the shaft 12 within the shell 11 between the armature and the rear journal housing 14 is a commutator. The elements of the electric motor contained within the shell 11 are of conventional construction and their operation is well-known; however, the particular power factor of the electric motor arising out of the particular design criterion used to assemble the electric motor features usually differs among starting motors made by different vehicle manufacturers and between different engine installations for different styles and makes of vehicles depending upon the torque requirements necessary to start the particular engine used in an individual manufacturer's vehicle engine installation. In addition, the particular sense of rotation given the starter driveshaft may vary.

In accordance with the generally universal design of a Bendix starter, the starting motor 10 includes a relatively smaller cylindrical casing housing 15 containing a solenoid switch mechanism. The cylindrical housing 15 is disposed longitudinally parallel with the relatively larger shell 11 in an overlying relationship with the shell. The solenoid switch mechanism is of conventional construction, including a longitudinally reciprocable solenoid armature disposed on a longitudinally extending armature rod. The trailing end of the cylindrical housing 15 is provided with a plurality of suitable electrical wire connector elements 16 for connecting the solenoid switch with the vehicle battery (not shown). Within the solenoid housing 15 adjacent the trailing end, there is provided magnetic coil, which when energized with electrical current from the battery, sets up a powerful magnetic field to pull the solenoid armature and its shaft longitudinally rearward. This magnetic coil is also suitably disposed in an electric circuit of conventional design, such that, after the solenoid armature has been pulled fully rearward, electric current is fed to the commutator of the electric motor disposed in the main casing shell 11.

The main casing shell 11 and the solenoid housing 15 terminate at their forward ends 17 and 18, respectively, with parallel disposed open faces out of which correspondingly project the rotatable armature shaft 12 and the reciprocable solenoid armature shaft. A hollow end cap assembly, indicated generally at 19, serves as the forward end housing portion of the starting motor 10 to contain the outwardly projecting portion of the solenoid armature shaft and, at least partially, the outwardly projecting portion of the electric motor rotary shaft 12. The end cap assembly 19 comprises an inboard cap housing 20 which releasably force fits onto the respective open end faces 17 and 18 of the electric motor shell 11 and solenoid housing 15 in conventional fashion. Due to the size differences of the main casing shell 11 and the solenoid housing 15, the cap housing portion 20 is formed with a relatively large cylindrical portion 21 at one end for engaging the electric motor shell 11 and a relatively smaller, somewhat cylindrical portion 22 at the other end for covering over the forward end 18 of the solenoid housing 15. The cylindrical portions 21 and 22 of the cap housing 20 are integrally interconnected by a hollow channel portion 23, typically of reduced width relative to the cylindrical end portions 21 and 22.

The forward end of the end cap assembly 19 is formed with a mounting flange member, generally indicated at 24. The mounting flange portion 24 may be integrally formed on the cap housing 20 or be a separate piece spot welded to the cap housing. The mounting flange portion 24 is formed with a plate portion 25 which fits over the forward end of the large cylindrical portion 21 of the end cap housing 20 and has a peripheral margin reaching radially beyond the annular surface of the end cap portion 21 containing mounting bolt eye holes, such as indicated at 26.

There is typically formed on the forward or outboard face of the mounting flange 25, such as in the case of this Chrysler starting motor 10, a bell or nose housing portion 27. The bell housing 27 carries the forward shaft journal housing 13 at its lead end and is formed with a lateral opening 28 exposing a portion of the armature shaft 12.

Disposed for slidable movement along the armature shaft 12 is a pinion sleeve 30 of generally conventional construction for use in a Bendix starter. The pinion sleeve 30 is formed at its lead end with a small gear wheel or pinion 31 followed by a relatively enlarged roller freewheel casing 32 of conventional construction. In typical fashion, the trailing portion of the pinion sleeve 30 is a tubular portion 33 of reduced diameter relative to the circumference of the roller freewheel 32 and which is disposed substantantially within the confines of the end cap cylinder portion 21. The pinion sleeve trailing portion 33 has interior threads engaging with quick screw threads formed on the armature shaft 12. In accordance with conventional construction, a pivotable trigger level is disposed in the end cap housing 20 with one end operatively engaged with the pinion sleeve trailing portion 33 and the other opposed end connected directly to the outer free end of the solenoid armature shaft. The trigger lever is connected with a strong spring bias such that the end of the trigger lever connected to the pinion sleeve is initially directed rearward toward the electric motor armature and the opposed end is disposed forwardly in the end cap portion 22 adjacent the solenoid housing 15. This initial, home position of the trigger level places the pinion sleeve 30 and its pinion 31 in the solid line position shown in FIG. 1.

In accordance with conventional Bendix starter operation, the conduction of current from the vehicle battery through the electrical connection 16 at the solenoid switch housing 15 initially causes the armature of the solenoid switch to be attracted toward the coil at the trailing end of the solenoid housing 15, such that the pinion sleeve 30 is pushed forward along the armature shaft 12, while it rotates about the quick screw threads, as the result of pivotal movement of the trigger lever against the bias of its return spring force. When the armature of the solenoid switch has been attracted, the solenoid switch closes and current flows to the commutator of the electric motor, such that the armature of the electric motor begins to rotate and screws the pinion sleeve 30 completely forward until reaching a limit stop in the form of a ring 34 locked on the driveshaft 12 as shown in dotted line configuration in FIG. 1. At this point, the pinion 31 is positioned in the bell housing opening 28 and engages with the gear teeth on the vehicle engine flywheel 35. The gear drive connection between the pinion 31 and the flywheel 35 permits the electric motor of the starter 10 to turn the flywheel and, hence, turn the engine to initiate firing. When the engine fires, the vehicle starting circuit is deactivated and current ceases to flow to the solenoid switch, releasing the solenoid armature. The trigger lever is then pulled back to the home position by its return spring and the pinion gear 31 is removed from drive connection with the flywheel 35.

The starting motor 10 is uniquely constructed by Chrysler for adaptation in its associated engine installation. Adaptation requirements not only include the starting motor power factor and sense of rotation of the armature shaft, but also depend upon overall length, width, and height spacial dimensions and end cap configuration for the starter selected by the vehicle manufacturer to mount the starting motor on a flywheel housing 36 used in that engine installation. For this particular engine installation, Chrysler provides a starter mounting arrangement wherein the flywheel housing 36 has a bottom wall flange 37 spaced vertically beneath a flywheel hub portion 38 and a generally planar wall 39. There is defined between the planar wall 39 and the bottom flange 37 an opening 40 for receiving the mounting plate 25 and, thus, locate the driveshaft 12 beneath the flywheel 35. The wall 39 and flange 37 have abutment ends 41 and 42, respectively, for mating with corresponding surfaces formed on the starting motor mounting flange 25 to position the starting motor against the flywheel housing 36. An interior tapered cavity 48 is formed in the flywheel housing between the bottom flange 37 and hub portion 38 for which the starter bell housing 27 is tapered for insertion.

To lock the starter 10 into position on the engine starter mounting, the bottom flange 37 and wall 39 are formed with suitable bolt-receiving bosses 43 for mating with the bolt openings 26 formed in the starting motor flange 25 such that the starting motor 10 can be bolted to the flywheel housing 36. Formed on the starting motor shell 11 is a further bolt connection flange 44 having a eye hole 45 to mate with a bolt connection opening 46 formed in a further engine installation support wall 47 to provide a trailing end bolt support connection for the starting motor 10.

Typically, the particular starting motor configurations and starter mountings in an engine installation of one vehicle manufacturer differ appreciably from the corresponding arrangement utilized by another vehicle manufacturer and different engine installations offered by one vehicle manufacturer will have different starting motor mounting requirements. This situation precludes convenient substitution of the starting motor from one engine installation to replace the starting motor in another engine installation. The present invention is directed to a method and apparatus for adapting the starting motor from one engine installation to replace the starting motor in a different engine installation.

Figure 2:
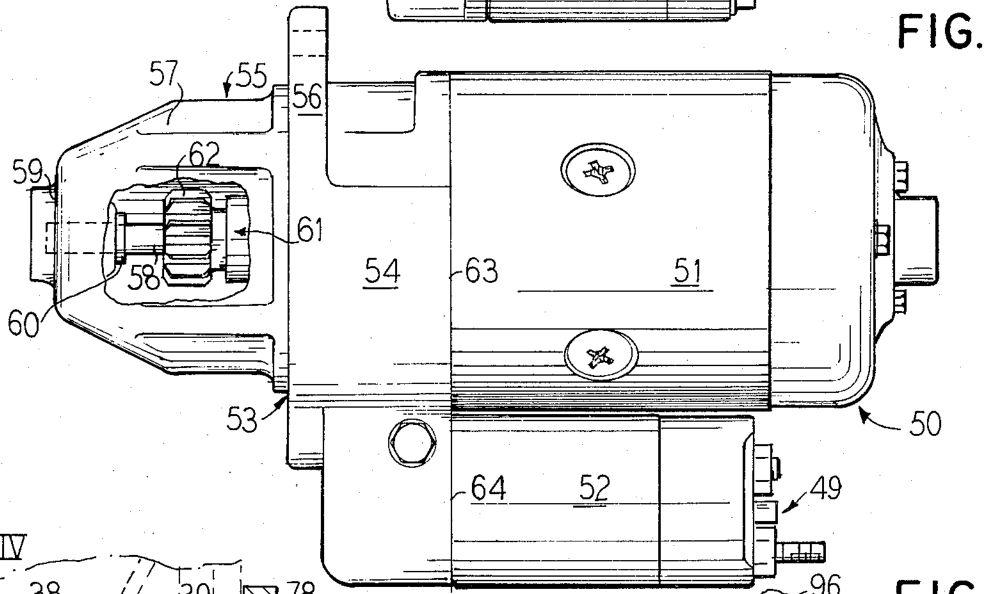
FIG. 2 is a broken-away side elevational view of an electric starting motor of the Bendix type originally manufactured for starter mounting requirements in an engine installation of a vehicle manufacturer different from that of FIG. 1.

The inventive process begins with the selection of a suitable donor starter, the core of which is to be converted for substitution. FIG. 2 illustrates a starting motor 50 of the Bendix type having a sense of rotation corresponding to that of the starting motor being replaced and a power factor about equal to or greater than that of the original starting motor. The starting motor to be converted in accordance with the present invention must also have suitable length, width, and height dimensions for its main motor shell and solenoid switch housing, which form the core of the replacement motor, to permit adaptation, into the spacial confines of the engine installation for which it is being rebuilt.

The starting motor 50 is originally manufactured by Toyota for its compact car engine installations. This starting motor has a cylindrical motor casing shell 51 and a smaller, overlying solenoid housing 52 of slightly smaller diameters and longer relative lengths than the corresponding counterpart structure in the starting motor 10; however, these dimensional differences can be compensated for by virtue of the inventive conversion process such that the starting motor 50 can be rebuilt to fit the engine installation of starting motor 10. The sense of rotation and power factor of the starting motor 50 suitably correspond to that of the starting motor 10. Assuming that the starting motor 50 is no longer being used in its particular original engine installation, such as if the Toyota car from which it came has been junked, the starting motor 50 is suitable as the initial piece with which to form the inventive replacement starting motor. Electrical connectors 49 used on the solenoid of the starter 50 may be different than those used on the starter solenoid of another manufacturer.

Since the starting motor 50 is a Bendix type starter, the electric motor, a trigger lever, and solenoid switch features contained therein will be comparable to that of the starting motor 10 to be replaced. The starting motor 50 is formed with an end cap assembly 53 having an end cap housing 54 with a mounting flange portion 55 connected thereto including a mounting plate 56 and bell housing 57. However, the end cap housing 54 and mounting flange portion 55 are configured differently from that of the corresponding counterparts in the starting motor 10, since the starting motor 50 is adapted for a different engine installation. For instance, the bell housing 57 is of larger diameter and longer than the bell housing portion 27 used on the starting motor 10 and the mounting plate 56 is formed with differently arranged extremity portions containing bolt eye holes than that of the mounting plate 25 on the starting motor 10. In addition, the starting motor 50 contains a rotary armature shaft 58 of considerably longer length than the corresponding armature shaft 12 of the starting motor 10 such that the bell housing 57 contains a forward journal housing 59 disposed considerably forwardly of the corresponding journal housing 13 of the starting motor 10 and a stop ring 60 disposed relatively forward of where the counterpart stop 34 is disposed along the length of the starter 10. The starting motor 50 contains a pinion sleeve 61 of conventional construction; however, this pinion sleeve has an overall length greater than that of the pinion sleeve 30 for the starting motor 10 such that the pinion sleeve 61 cannot readily replace the pinion sleeve 30 in the starting motor 10, because the pinion gear 62 would not have a retracted position on the armature shaft 12 which would clear the flywheel 35. In all cases, in accordance with the conversion process of the present invention, end cap assemblies and pinion sleeves of the starting motor from one engine installation to be rebuilt for adaptation into another engine installation must be newly developed for construction of the replacement starting motor. In almost all cases, the armature shaft of the starting motor from the one engine installation must be adjusted for adaptation in the replacement starting motor for the different engine installation.

The motor shell 51 and solenoid housing 52 terminate at their forward ends 63 and 64, respectively, with parallel disposed open faces. The open faces define a separation line with the end cap assembly 53 which is in releasable force fit connection therewith in the conventional fashion.

Figure 3:
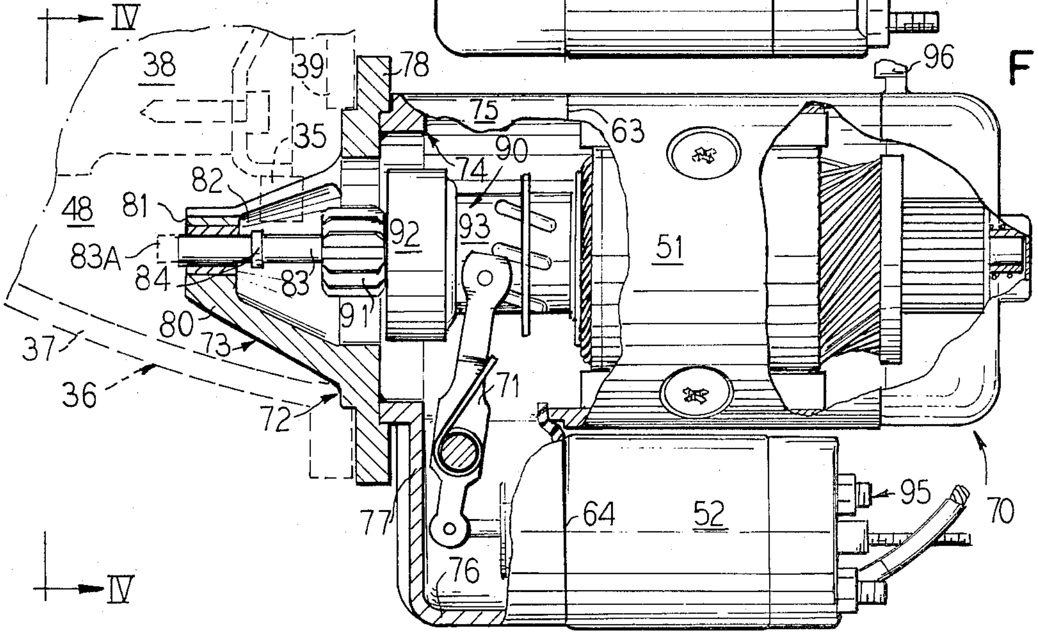
FIG. 3 is a broken-away side elevational view of an electric starting motor of the Bendix type adapted from a portion of the starting motor of FIG. 2 to replace the starting motor of FIG. 1 in the original engine installation of FIG. 1.
Figure 4:
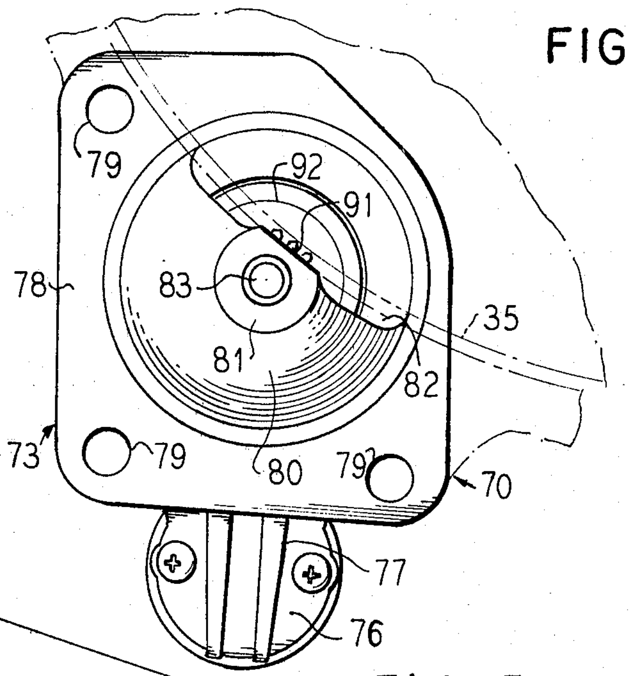
FIG. 4 has a front side elevational view taken along the lines IV—IV of FIG. 3.

FIGS. 3-4 show a replacement electric starting motor 70 of the Bendix type representing a conversion of the starting motor 50 originally manufactured for use in a Toyota engine installation to replace the starting motor 10 in its Chrysler engine installation constructed in accordance with the present invention. The end cap assembly 53 is detached and the cylindrical motor shell 51 and the overlying solenoid switch housing 52 and all the internal features contained therein are carried over as a core for the replacement starting motor 70. Further, the Toyota trigger lever element, shown in FIG. 3 at 71, is also retained for use in the replacement starting motor 70. However, the replacement starting motor 70 is formed with a new and distinctive end cap assembly 72 having a configuration and spacial dimensions enabling the starting motor 70 to be suitably aligned and mounted onto the flywheel housing 36 of the Chrysler engine installation, despite the use of a motor shell 51 and solenoid housing 52 which have different spacial dimensions than that of their corresponding counterparts 11 and 15 utilized on the Chrysler starting motor 10 being replaced. Thus, the overall length of the end cap assembly 72 is slightly less than that of the end cap assembly 19 for starting motor 10 and considerably less than that of the end cap assembly 53 of starting motor 50.

The end cap assembly 72 is formed with a forward mounting flange portion 73 and a cap housing portion 74 for connecting with and covering the open forward faces 63 and 64 of the motor shell 51 and solenoid housing 52. The cap housing 74 includes a relatively large cylindrical portion 75 for mating with the motor shell 51 and a relatively smaller cylindrical portion 76 enclosing the forward open end of the solenoid housing 52. Interconnecting the opposed end cylindrical portions 75 and 76 of the end cap housing is a hollow housing channel 77 of relatively reduced width. The end cap housing 74 is formed with overall height and width dimensions similar to that of the end cap housing 54 to enable proper mating of the cylindrical portions 75 and 76 with the starting motor shell casing 51 and solenoid housing 52, respectively.

In order to provide a suitable longitudinal length dimension for the new end cap assembly 72, the length dimension of the cap housing 74 is preferably set at a minimum substantially equal to the length of the cap housing 54 used in the converted starting motor 50. The overall longitudinal length dimension of the mounting flange 73 is variably adjusted so as to be different from that of the counterpart flange in the converted starter 50 and the original starter 10 such that the replacement starter 70 may fit the original starter mountings of the Chrysler engine installation. Thus length dimension correction for the end cap assembly 72 is totally compensated for in the length dimension set for the mounting flange portion 73 alone; however, adjustment of the overall length dimension for the replacement starter end cap assembly 72 may be compensated for in length dimensions set for both the mounting flange and cap housing portions.

With reference to FIGS. 3 and 4, the mounting flange portion 73 of the replacement starting motor end cap assembly contains a mounting plate 78 with a radially outward extending margin extremity containing suitable eye holes placed for corresponding alignment with the bolt holes in the mounting bosses formed on the Chrysler flywheel housing 36. The mounting flange 73 is formed with a bell housing 80 having a configuration different from that of the bell housing 27 of the starting motor 10 to be replaced, but having a tapering forward end portion terminating in a forward journal housing 81. Although the overall configuration of the replacement starting motor bell housing 80 is different from that on the starting motor 10 being replaced, the width, height, and length spacial dimensions of the bell housing 80, as well as the mounting plate 78, are set such that the bell housing portion is adapted to fit within the confines of the opening 40 and cavity 48 arranged for it in the flywheel housing 36, such that the outer end of the bell housing 80 terminates at a point substantially identical to the point of termination of the bell housing 27 on the original starting motor 10 in the flywheel housing 36.

The bell housing 80 is formed with a lateral opening 82 arranged to receive a circumferential portion of the flywheel 35 in the Chrysler engine installation.

The replacement starting motor contains a rotary driveshaft 83 supported at one end in the forward journal housing and at its opposed rear end in the trailing journal housing formed on the motor shell 51. The driveshaft 83 is in the initial armature shaft 58 from the starting motor 50 being converted; however, as will occur in most adaptation processes, the armature shaft 83 is a lengthwise corrected version of the original armature shaft. In some instances it may become necessary to add further length to the original armature shaft from the starting motor being converted for use in the replacement starting motor. In this particular instance, where a Toyota starting motor is being converted for adaptation in a Chrysler engine installation, a lead end portion 83A of the armature shaft 58 has been cut off making the armature shaft 83 a shortened version of the original shaft 58 to correspond to the spacial requirements necessary for the replacement starting motor 70 to adapt to the Chrysler engine installation. Further, a new stop ring mounting 84 is provided on the driveshaft 83 at a location different from where the stop 60 is positioned on the initial shaft 58, but substantially coinciding with the positioning of the stop 34 on the shaft 12 in the starting motor 10 being replaced.

Slidably disposed on the armature shaft 83 is a newly developed pinion sleeve 90 having a pinion wheel 91 formed at its lead end, followed by a relatively enlarged roller free-wheel portion 92, and terminating with a cylindrical tube portion 93. The replacement starting motor pinion sleeve is of an overall length slightly less than that of the pinion sleeve 30 in the starting motor 10 and considerably less than the pinion sleeve 60 of the starting motor 50 being converted in order to afford suitable spacial arrangement in the replacement starting motor 70 such that actuation of the trigger lever 71 will bring the pinion 91 suitably into and out of driving engagement with the flywheel 35 in the Chrysler engine installation. The pinion 91 has a gear tooth arrangement comparable with that of the pinion 31 used in the starting motor 10 being replaced but different from that of the pinion 61 in the starting motor 50 being converted, in order to permit proper driving engagement with the toothed rim of the flywheel 35. The roller free-wheel portion 92 is of a construction comparable to the roller freewheel 32 in the original starting motor 10. The tube portion 93 is formed with internal screw threads matched for operative engagement with the quick screw threads formed on the armature shaft 58, which is now length-adjusted armature shaft 83, to permit back and forth movement of the pinion sleeve 90 on the replacement motor armature shaft, while rotating. The quick screw thread design may be different from that of the quick screw thread design utilized in the original starting motor 10.

Thus, the starting motor from one engine installation in a vehicle built by a first manufacturer is converted into a replacement starting motor which can substitute for an original starting motor arranged in a different engine installation offered by a second vehicle manufacturer. In this manner, the replacement starting motor serves as a rebuilt starter which can be sold at considerably less cost than a new starter built by the second vehicle manufacturer for its own particular engine installation. To complete the conversion process, the electrical connections 49 formed on the solenoid housing of the starter 50 being converted can be rebuilt, as indicated at 95 to substantially duplicate the electrical connections 16 on the original starting motor 10 and a secondary mounting flange 96, which substantially duplicates the mounting flange 44 on the original starter, can be added for adaptation to such secondary mounting connections as 47 in the engine installation to which the replacement starting motor is to be applied.

Figure 5:
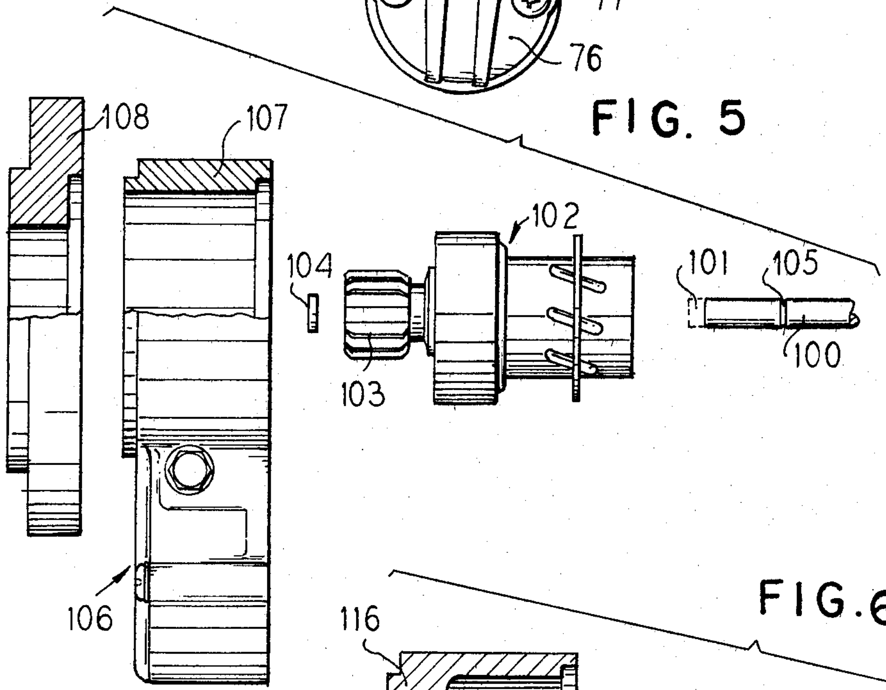
FIG. 5 is a partly broken away side elevational assembly view of an end cap assembly, pinion sleeve, and armature shaft for use in a replacement electric starting motor adapted to fit starter mounting requirements in an engine installation of a vehicle manufacturer different from that of FIGS. 1 and 2.

In some instances, original starting motors are constructed by vehicle manufacturers without the use of a bell housing on the mounting flange. For example, Volkswagen utilizes a Bendix type electric starter having only a mounting plate at the forward end of the overall starter housing for its Dasher style automobiles. In accordance with the present invention, the Toyota Bendix starting motor 50 shown in FIG. 2 can be converted into a replacement starting motor suitable for substitution in the Volkswagen engine installation with the use of newly developed starting motor elements shown in FIG. 5. The armature shaft 58 of the starting motor 50 is length-adjusted to form a new replacement motor armature shaft 100, a dotted line lead end portion of the shaft being cut off from the armature shaft 58. A newly developed pinion sleeve 102 having a pinion gear 103 at its lead end suitable for driving engagement with the teeth of the Volkswagen flywheel is provided for the replacement starting motor. The overall length of the pinion sleeve 102 is different from that of the original pinion sleeve used in the Volkswagen starting motor and considerably shorter than the pinion sleeve 60 used in the starting motor 50 being converted in order to suitably locate the pinion 103 into and out of engagement with the flywheel during starting motor operation. A new stop ring 104 is provided for mounting in an annular stop recess 105 formed as part of a conversion on the armature shaft 100 to suitably located the forward limit of movement of the pinion sleeve 102 to permit driving engagement of the pinion 103 with the engine installation flywheel. A new end cap assembly 106 is developed having a suitably configured end cap housing portion 107 and mounting flange 108 to cover the open forward faces of the converted starter motor shell and solenoid switch housing and to permit mounting of the replacement starting motor to the particular starter mountings arrangement in the Volkswagen engine installation, respectively. The end cap housing 107 is preferably spot welded to the mounting flange 108 prior to construction of the replacement starting motor. One or both of the end cap assembly portions 107 and 108 have length dimensions different from that of the corresponding counterpart strucutre in the starting motor 50 and the original starting motor being replaced in order to permit adaptation of the replacement starting motor with its Toyota motor shell 51 and solenoid housing 52 core in the Volkswagen engine installation. In this particular replacement starting motor no bell housing is used. The lead end of the armature shaft is supported for rotation in a journal built into the flywheel housing and against which the stop ring 104 may abut. Accordingly, the pinion 103 extends freely into the engine installation flywheel housing for movement back and forth into and out of driving engagement with the flywheel.

Figure 6:
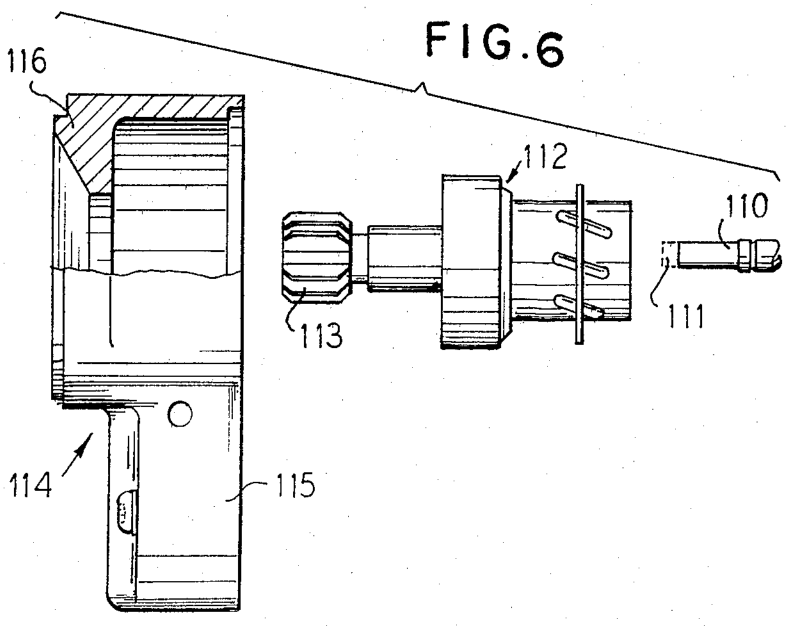
FIG. 6 is a partly broken away side elevational assembly view of an end cap assembly, pinion sleeve, and armature shaft for a replacement electric starting motor adapted to fit starter mounting requirements in an engine installation different from that of FIGS. 1, 2, and 5.

FIG. 6 shows newly developed starting motor elements provided in accordance with the present invention to be used in converting the Toyota starting motor 50 into a replacement starting motor to substitute for the starting motor made by Chrysler for its Omni style automobile having a manual transmission engine installation. The armature shaft 58 from the Toyota starting motor 50 is used to form a replacement starting motor armature shaft 110 by being length-adjusted with a lead end portion 111 of the initial armature shaft 58 being cut-off. A newly developed pinion sleeve 112 is provided having a pinion gear 113 formed at its lead end suitably toothed for driving engagement with this particular Chrysler engine installation flywheel. The overall length of the pinion sleeve 112 is different from that of the original pinion sleeve used in the Omni starting motor being replaced and considerably shorter than the pinion sleeve 60 used in the starting motor 50 being converted in order to suitably locate the pinion 113 with respect to the engine installation flywheel during starting motor operation. A newly developed end cap assembly 114 is provided for the replacement starting motor having a suitably configured end cap housing 115 and mounting flange 116 for respectively covering the converted starting motor shell 51 and solenoid housing 52 and permit mounting of the replacement starting motor to the particular starter mountings provided on the Omni flywheel housing. As shown in FIG. 6, the end cap assembly 114 may be integrally cast. One or both of the end cap assembly portions 115 and 116 have length dimensions different from that of the corresponding counterpart structure in the starting motor 50 and the original starter being replaced in order to permit adaptation of the replacement starting motor in the Omni engine installation. In this particular replacement starting motor, no bell housing is used such that the pinion 113 extends freely into the Omni engine installation flywheel housing for movement back and forth into and out of driving engagement with the flywheel.

Although various minor modifications may be suggested by those versed in the art, it should be understood that I wish to embody within the scope of the patent warranted hereon all such modifications as reasonably and properly come within the scope of my contribution to the art.

I claim as my invention:

1. A rebuilt starter motor adapted from a donor starter motor of one engine installation for use in a different engine installation having a different longitudinal length spatial dimension and starter mountings than said one engine installation, said donor starter motor being of a type having a main motor casing housing an electric motor with an armature driven rotary shaft defining a longitudinal axis and projecting from a forward end of said motor casing, an overlying smaller housing containing a solenoid means with a reciprocable armature projecting from a forward end of said solenoid housing, a pinion sleeve slidably disposed on said shaft with a pinion gear formed on a forward end thereof, a pivotable lever means connected between said pinion sleeve and said solenoid armature, and an end cap assembly for securing the starter in said one engine installation starter mountings connected to said forward ends of said motor casing and solenoid housing and containing said lever means, said pinion sleeve, and a portion of said shaft, comprising:

a core portion consisting of the electric motor, motor casing, solenoid means, lever means, and solenoid housing of said donor starter motor, a new end cap assembly having spatial dimensions and securement portions for adapting said core portion to fit and mount in said different engine installation, the longitudinal length dimension of said new end cap assembly being different from that of said donor starter motor end cap assembly, and a new pinion sleeve having a pinion gear suitable for use in said different engine installation and a longitudinal length dimension for adapting operation of said rebuilt starter motor to said different engine installation.

2. The rebuilt starter motor of claim 1, wherein said new and donor end cap assemblies comprise an inner cap housing portion and an outer free end mounting flange, said rebuilt starter motor cap housing having a longitudinal length dimension substantially equal to that of said donor starter motor cap housing and mounting flange having a selected longitudinal length dimension to fit said rebuilt starter motor core portion and cap housing portion in said different engine installation.

3. The rebuilt starter motor of claim 2, further comprising a new armature driven rotary shaft being a longitudinal length-adjusted version of said donor starter motor shaft to fit said different engine installation.

4. A rebuilt starter kit having components capable of converting a donor starter of one engine installation for use in a different engine installation having a different longitudinal length spatial dimension and starter mountings than said one engine installation, said donor starter having a main motor casing housing an electric motor with an armature driven rotary shaft defining a longitudinal axis and projecting from a forward end of said motor casing, an overlying smaller housing containing a solenoid means with a reciprocable armature projecting from a forward end of said solenoid housing, a pinion sleeve slidably disposed on said shaft with a pinion gear formed on a forward end thereof, a pivotable lever means connected between said pinion sleeve and said solenoid armature, and an end cap assembly for securing the starter in said one engine installation starter mountings connected to said forward ends of said motor casing and solenoid housing and containing said lever means, said pinion sleeve, and a portion of said shaft, comprising:

a further end cap assembly for replacing said donor starter end cap assembly having spatial dimensions and securement portions for adapting said donor starter motor casing and solenoid housing to fit and mount in said different engine installation.

5. The rebuilt starter kit of claim 11 wherein each of said donor starter and replacement end cap assemblies comprises a hollow cap housing for connecting to said donor starter motor casing and solenoid housing and a mounting flange, said cap housing of said replacement end cap assembly having a longitudinal length dimension substantially equal to the longitudinal length of said donor starter cap housing.

6. The rebuilt starter kit of claim 4, further comprising:

a replacement pinion sleeve for replacing said donor starter pinion sleeve having a replacement pinion gear suitable for use in said different engine installation and a longitudinal length suitable for use with said donor starter lever means in said different engine installation.

7. The rebuilt starter kit of claim 6, further comprising:

a replacement armature driven rotary shaft for use in said donor starter electric motor, said replacement shaft being a longitudinal length-adjusted version of said donor starter shaft so as to fit said different engine installation.

8. The rebuilt starter kit of claim 14, wherein each of said replacement starter end cap assembly includes a bell housing formed with a tapered free end containing a forward journal housing for supporting said replacement shaft, the overall spatial volume taken up by the tapered free end of said replacement end cap assembly bell housing fitting in said different engine installation.

9. The rebuilt starter kit of claim 4, wherein both of said donor starter is of the Bendix type.

10. The rebuilt starter kit of claim 4, wherein the power factor for said donor starter electric motor is approximately equal to or greater than the power factor required in said different engine installation.

11. A conversion package for rebuilding a donor starter of one vehicle engine installation to replace starters used in different vehicle engine installations, said donor starter having a main motor casing housing an electric motor with an armature driven rotary shaft defining a longitudinal axis and projecting from a forward end of said motor casing, an overlying smaller housing containing a solenoid means with a reciprocable armature projecting from a forward end of said solenoid housing, a pinion sleeve slidably disposed on said shaft with a pinion gear formed on a forward end thereof, a pivotable lever means connected between said pinion sleeve and said solenoid armature, and an end cap assembly for securing the donor starter in said one engine installation starter mountings connected to said forward ends of said motor casing and solenoid housing and containing said lever means, said pinion sleeve, and a portion of said shaft, said end cap assembly having an interconnected inner cap housing portion and an outer free end mounting flange, which package provides the required overall longitudinal length dimension, power factor, mounting connections, and shaft sense of rotation for use in different engine installations, comprising:

a replacement cap housing portion for connection to said donor starter motor casing and solenoid housing having a minimum longitudinal length dimension and a replacement mounting flange secured to said new cap housing with a selected longitudinal length dimension to operatively position said donor starter motor casing and solenoid housing and said replacement cap housing in the starter mountings of different engine installations, whereby said new mounting flange may be varied in longitudinal length to accommodate variations in length requirements for starter mountings in different engine installations.

12. The conversion package of claim 11, further comprising:

a replacement pinion sleeve for use on said former starter shaft having a selected longitudinal length dimension to accommodate relative variations in required locations for pinion gear driving engagement for starter mountings in different engine installations.

13. A method of converting an internal combustion engine powered vehicle starting motor for use in different engine installations, said starting motor having a main motor casing housing an electric motor with an armature driven rotary shaft defining a longitudinal axis and projecting from a forward end of said motor casing, an overlying smaller housing containing a solenoid means with a reciprocable armature projecting from a forward end of said solenoid housing, a pinion sleeve slidably disposed on said shaft with a pinion gear formed on a forward end thereof, a pivotable lever means connected between said pinion sleeve and said solenoid armature, and an end cap assembly for securing the starter in one type of engine installation starter mountings connected to said forward ends of said motor casing and solenoid housing and containing said lever means, said pinion sleeve, and a portion of said shaft, said end cap assembly having an interconnected inner cap housing portion and an outer free end mounting flange, comprising:

replacing said starting motor end cap assembly with a new end cap assembly having an inner cap housing portion of minimum longitudinal length dimension and a mounting flange of selected longitudinal length dimension to adapt the starting motor casing and solenoid housing to various starter mountings in different engine installations.

14. The method of claim 13, further comprising:

replacing said starting motor pinion sleeve with a new pinion sleeve housing a different longitudinal length dimension to permit said starting motor to operate in various starter mountings of different engine installations.

15. A method of forming a rebuilt starter to replace a former starter of one engine installation, said former starter of a type having a main motor casing housing an electric motor with an armature driven rotary shaft defining a longitudinal axis and projecting from a forward end of said motor casing, an overlying smaller housing containing a solenoid means with a reciprocable armature projecting from a forward end of said solenoid housing, a pinion sleeve slidably disposed on said shaft with a pinion gear formed on a forward end thereof, a pivotable lever means connected between said pinion sleeve and said solenoid armature, and an end cap assembly for securing the starter in said one engine installation starter mountings connected to said forward ends of said motor casing and solenoid housing and containing said lever means, said pinion sleeve, and a portion of said shaft, comprising:

providing a donor starter fitted for a different engine installation having a different longitudinal length spatial dimension and starter mountings than said one engine installation and being of the same type as said former starter, removing the end cap assembly of said donor starter, and attaching a replacement end cap assembly to the donor starter motor casing and solenoid housing having spatial dimensions and securement portions for adapting said donor starter motor casing and solenoid housing to fit and mount in said one engine installation, the longitudinal length spatial dimension being different from that of said former starter and donor starter end cap assemblies.

16. The method of claim 15, further comprising:

removing the pinion sleeve of said former starter and applying a replacement pinion sleeve to the used starter shaft having a replacement pinion gear substantially identical to said former starter pinion gear and a longitudinal length dimension different from that of said former starter and donor starter pinion sleeves.

17. The method of claim 16, further comprising:

adjusting the longitudinal length of said donor starter shaft to be substantially equal to the longitudinal length of said former starter shaft.

18. A method of converting a donor starter of one engine installation for use in a different engine installation having a different longitudinal length spacial dimension and starter mountings, said donor starter including a main motor casing housing an electric motor with an armature driven rotary shaft defining a longitudinal axis and projecting from a forward end of said motor casing, an overlying smaller housing containing a solenoid means with a reciprocable armature projecting from a forward end of said solenoid housing, a pinion sleeve slidably disposed on said shaft with a pinion gear formed on a forward end thereof, a pivotable lever means connected between said pinion sleeve and said solenoid armature, and an end cap assembly for securing the starter in said one engine installation starter mountings connected to said forward ends of said motor casing and solenoid housing and containing said lever means, said pinion sleeve, and a portion of said shaft, comprising:

removing said end cap assembly from the donor starter, providing a replacement end cap assembly with spatial dimensions and securement portions fitting said different engine installation, attaching said replacement end cap assembly to said donor starter motor casing and solenoid housing, and installing the donor starter with the attached replacement end cap assembly on the starter mountings of said different engine installation.

19. The method of claim 18, further comprising:

removing said pinion sleeve of said donor starter and applying a replacement pinion sleeve to said donor starter shaft having a pinion gear suitable for use in said different engine installation and a longitudinal length dimension suitable for use with said donor starter lever means in said different engine installation.

20. The method of claim 19, further comprising:

adjusting the longitudinal length of said donor starter shaft to fit said different engine installation.

* * * * *